Dec. 26, 1961   G. SWIKART   3,014,405
BINOCULAR BIFOCAL MAGNIFIER AND ILLUMINATOR
Filed Nov. 19, 1959
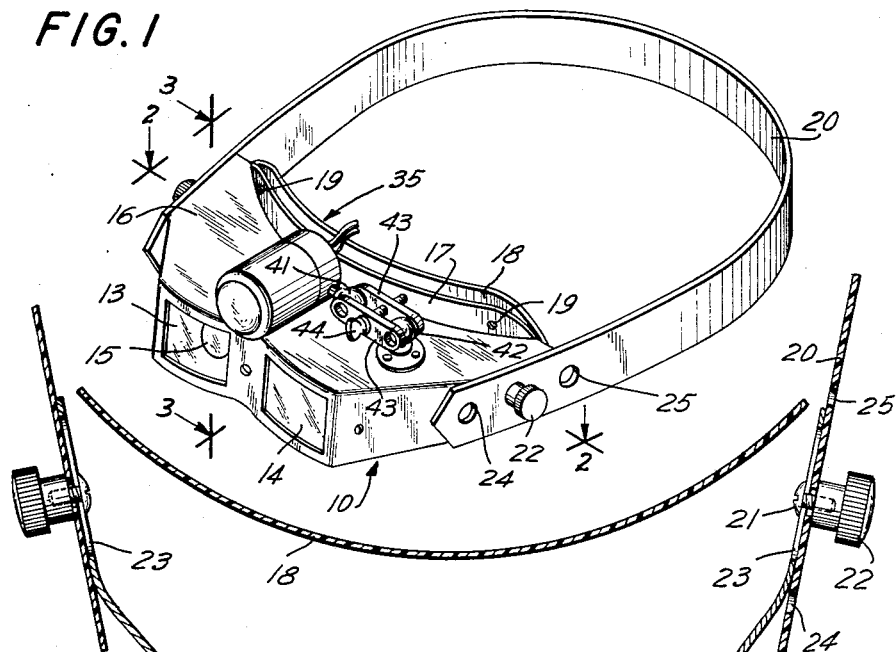
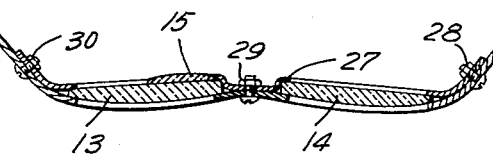
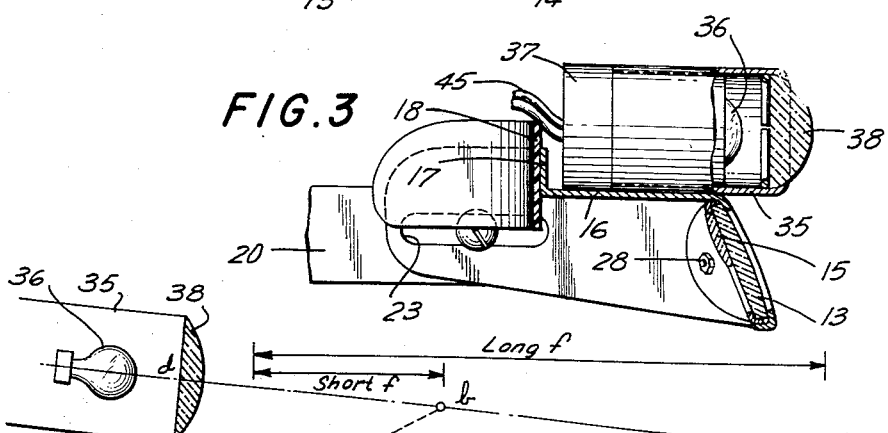
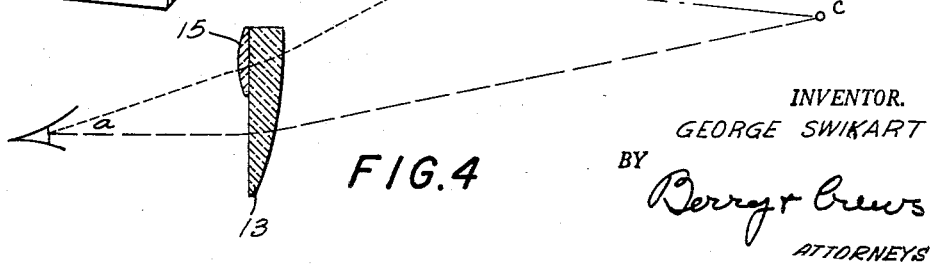
INVENTOR.
GEORGE SWIKART
BY
Berry + Crews
ATTORNEYS

United States Patent Office 3,014,405
Patented Dec. 26, 1961

3,014,405
BINOCULAR BIFOCAL MAGNIFIER AND
ILLUMINATOR
George Swikart, 568 Palmer Road, Yonkers, N.Y.
Filed Nov. 19, 1959, Ser. No. 854,050
1 Claim. (Cl. 88—39)

My present invention relates to a combined binocular bifocal magnifier-eye-protector of the type worn upon the head of the user, such device also being known as a binocular loupe. For dual use a small auxiliary lens of plus curvature is affixed to one of the main or distant lenses, thus enabling not only ordinary binocular use for work held in the field of the foci of the main lenses, but monocular use at the shorter focus of the high-power lens. It is an object of my invention to combine a magnifier of the type described, with an illuminator which may be used to illuminate both fields without readjustment when viewing first one field, and then the other.

A further object is to provide such an illuminator having a universal mounting which will be adapted not only for the purpose above stated, but also may be used for oblique illumination of other fields of view when this is desired.

Other objects to be attained and advantages thereof, will be apparent as the description proceeds.

My invention will be best understood by reference to the following detailed description taken with the annexed drawing, in which FIGURE 1 is a perspective view of an illustrative embodiment;

FIGURE 2 is a sectional view taken in a horizontal plane along line 2—2 of FIGURE 1;

FIGURE 3 is a view in vertical section taken along line 3—3 of FIGURE 1; and

FIGURE 4 is a diagram showing the relationship of the illuminator to the focal fields of the main and compound lenses.

Referring to FIG. 1, 10 denotes a frame member for holding lenses 13, 14 which are ground to a plus curvature, as well as to contain the customary prisms with the bases in (seen in FIG. 4), as is customary in the art, to reduce the effort of convergence when viewing a near object. Superposed on one of the lenses, e.g., upon the right lens 13 for a right-eyed person, and preferably at the upper inner corner thereof, is auxiliary lens 15 having a stronger plus curvature, which is attached to or forms a part of the lens 13 in any suitable manner. Frame 10 also includes a top, generally horizontal portion 16 which extends from adjacent the top of the lenses 13, 14, to the brow of the wearer, and terminating in the upstanding integrally formed flange 17 to which may be attached as by rivets 19, 19 a band 18 of plastic or other suitable material for contact with the user's forehead. The customary head band 20 is attached to the frametop 16 as by means of screws 21 and knurled nuts 22, one set for each end of said frame top. Each screw 21 is contained in a slot 23 in band 20 to provide for the necessary adjustment. Also provided to this end are holes 24, 25 for optionally containing the screw-and-nut combination 21, 22. For holding the lenses 13, 14 in place, an integral, suitably flanged member 27 is provided which is attached to frame 16 by three screw-and-nut combinations 28, 29, 30.

The combination bifocal binocular magnifier-protector thus far described is conventional. For the purpose of carrying out the invention as above stated, i.e., to provide an illuminator which may be used for binocular use using the two main lenses 13, 14, and for the monocular use involving the higher power lens 15, a directed beam illuminator 35 is provided which is mounted upon the top portion 16. Illuminator 35 has a light bulb 36 contained in a base 37, and provided with a condensing lens 38, the latter being adapted for adjustment toward and away from the light bulb 36 by means of telescoping sleeves 39, 40. Attached to base portion 37 is a ball 41. Attached to top 16 is a ball 42, both of said balls being spaced from their supports as shown in FIG. 3, ball 42 being attached to said top portion by means of a pedestal as shown. Connecting said balls is a pair of link elements 43, 43, said elements having concave portions receiving said balls as shown, and being adjustably held together by means of a screw bolt 44. Bulb 36 is supplied with electric current of any suitable voltage through wires 45 from a source not shown.

It will be evident that by means of the double universal mounting shown in FIG. 3, it is possible for the user, when the light is turned on, to adjust the position of illuminator 35 to bring the axis of the light beam of substantially parallel rays to illuminate not only the focal region of lens 13, but also the focal region of the lens 15, as can be seen from FIG. 4. In this figure that part of the line a—b extending beyond the lens represents the focal length of the higher power lens 15, whereas the corresponding portion of the line a—c represents the focus of lenses 13, 14. Line d—c represents the axis of the beam from illuminator 35. As shown, both the points b and c lie upon the axis d—c. Because of the effect of the prism above mentioned, the lines a—b and a—c are bent around the base thereof as shown. Thus the user may shift his eye from one focal plane to the other without the necessity of readjusting the position of the light.

Having determined the proper position for the illuminator for any one user, such illuminator may remain fixed indefinitely without readjustment for observing the fields of both lenses 13 and 15. However, by the use of such adjusting means, not only may the illuminator be used for the dual purpose described, but may be shifted where necessity requires, as for example, to have oblique illumination which is often very useful in an instrument of this type.

While a certain preferred embodiment of the invention has been illustrated and described in detail, it is to be understood that changes may be made therein and the invention embodied in other structures. It is not therefore, the intention to limit the patent to the specific construction illustrated, but to cover the invention broadly in whatever form its principles may be utilized.

I claim:

A binocular, bifocal magnifier and illuminator comprising a frame member supporting a pair of base-in prismatic magnifier lenses in front of the wearer's eyes for binocular viewing of a centrally disposed focal area, said frame member including a generally horizontal top panel extending from adjacent the upper edges of said magnifying lenses to the brow of the wearer, and having means at the temporal sides for mounting on the wearer's head, one of said prismatic magnifier lenses having a relatively small auxiliary lens of short focal length mounted on one surface adjacent an upper and nasal corner thereof, for monocular viewing of a generally centrally disposed focal area closer to the lenses than the binocular focal area, and an illuminator comprising a casing, a lamp and optical means aligned with the lamp in the casing for producing a generally parallel illumination beam, said illuminator being mounted on said top panel by linkage means comprising a pedestal located adjacent one temporal side of said top panel remote from the bifocal magnifier lens, a pair of ball members one of which is carried by said casing and the other carried by said pedestal, and an elongated link means connecting said ball members, whereby the illuminator can be universally adjusted for oblique illumination of either focal area and can be adjusted to a generally central position closely adjacent the top panel for simultaneous aligned illumination of both focal areas.

References Cited in the file of this patent

UNITED STATES PATENTS

| | | |
|---|---|---|
| 933,499 | Taylor | Sept. 7, 1909 |
| 1,741,264 | Wappler | Dec. 31, 1929 |
| 2,353,537 | Arneson | July 11, 1944 |
| 2,812,688 | Shiffman | Nov. 12, 1957 |
| 2,964,613 | Schecter | Dec. 13, 1960 |

FOREIGN PATENTS

| | | |
|---|---|---|
| 386,163 | Great Britain | Jan. 12, 1933 |
| 595,729 | Great Britain | Dec. 15, 1947 |